United States Patent [19]

Bütefisch et al.

[11] Patent Number: 4,592,229
[45] Date of Patent: Jun. 3, 1986

[54] DEVICE FOR MEASURING PRESSURES AND VARIATIONS OF PRESSURE WITH TIME

[75] Inventors: Karl-Aloys Bütefisch, Bovenden; Horst Ahlbrecht, Göttingen, both of Fed. Rep. of Germany

[73] Assignee: Deutsche Forschungs- und Versuchsanstalt fur Lutf- und Raumfahrt EV, Fed. Rep. of Germany

[21] Appl. No.: 656,721

[22] Filed: Oct. 1, 1984

[30] Foreign Application Priority Data

Oct. 19, 1983 [DE] Fed. Rep. of Germany ....... 3337978

[51] Int. Cl.$^4$ .............................................. G01M 9/00
[52] U.S. Cl. ........................................ 73/147; 73/724; 73/727; 73/756
[58] Field of Search ................. 73/147, 180, 756, 714, 73/724, 726, 727, DIG. 4; 244/1 R, 76 C

[56] References Cited

U.S. PATENT DOCUMENTS

| | | | |
|---|---|---|---|
| 2,440,198 | 4/1948 | Green | 73/147 |
| 2,509,421 | 5/1950 | Carter | 73/147 |
| 2,551,526 | 5/1951 | Campbell | 73/147 |
| 2,871,698 | 2/1959 | Bagby | 73/147 |
| 3,178,939 | 4/1965 | Rochester et al. | 73/180 |
| 3,398,266 | 8/1968 | Willis | 73/147 |
| 3,460,383 | 8/1969 | Padera | 73/147 |

*Primary Examiner*—Donald O. Woodiel
*Attorney, Agent, or Firm*—Thomas & Kennedy

[57] ABSTRACT

A device for measuring pressures and variations of pressure with time at the surface of test objects, for example wind tunnel models, is equipped with a plurality of pressure-sensitive sensors (4) arranged on a carrier (3). The pressure-sensitive sensors (4) are seated flush with the surface in the carrier (3) and this, in turn, is arranged flush with the surface of the test object at the test location. In the carrier (3) an operational amplifier is provided for each sensor (4). The underside of each sensor (4) is connected via as short a line (10) as possible to the associated operational amplifier. At the carrier (3), connections (7, 11) for supplying the operational amplifiers (18) and for conducting the output signals are provided. All top sides of the sensors (4) are connected to each other and to a combined ground connection (5) of the operational amplifiers thru an electrically conductive coating.

4 Claims, 6 Drawing Figures

DEVICE FOR MEASURING PRESSURES AND VARIATIONS OF PRESSURE WITH TIME

FIELD OF THE INVENTION

The invention relates to a device for measuring pressures and variations of pressure with time at the surface of test objects, for example wind tunnel models, test vehicles and aircraft and similar, comprising a plurality of pressure-sensitive sensors arranged on a carrier.

BACKGROUND OF THE INVENTION

A device of the initially mentioned type is known. In this device, a plurality of pressure-sensitive sensors are combined or arranged line-by-line and column-by-column on a carrier, each pressure-sensitive sensor consisting of a membrane cell. Neither the carrier nor the sensors are arranged at the test location but it is necessary in each case to connect the test location via one hose each to the respective membrane cell. At the test location, the test object has a small hole in the corresponding surface from which the respective pressure is guided via one hose each to the sensor proper on the carrier. The carrier with the pressure-sensitive sensors can also be housed in the model to be examined, which then provides the advantage that the hose lines are possibly greatly shortened. However, this arrangement is possible only if it is permitted by the model's space conditions. If these space conditions are too restricted, the only choice is to accept longer hose lines and to arrange the carrier with the pressure-sensitive sensors outside the model and the test system which, in turn, creates the problem of passing the hoses from the test location thru the test system. The arrangement of the small holes in the surface of the test object at the test location can modify the surface of the test object in such a disadvantageous manner that the variables to be measured, that is to say the pressure or the variation of pressure with time is distorted merely by this factor. Due to the necessary hose lines, however, the possibly rapidly variable pressure characteristics are greatly affected in any case so that a measurement is possible only under restricted conditions and with great effort. In the arrangement of several test points in the surface of the test object to be examined, using the hose lines for passing on the pressure and the hose lengths possibly varying, it is necessary in every case—provided it is not steady-state pressures which are being examined—to take into consideration transfer functions in the measurement in order to be able to conduct any valid measurements at all. Although these known devices allow pressure measurements to be evaluated at several test locations, they are encumbered with the uncertainty of faulty measurements caused by transmission in the hose lines and also do not represent a solution of how to shape the surface of the test object at the test location without negatively influencing the flow.

On the other hand, it has been attempted to miniaturize pressure-sensitive sensors in single-component construction or single arrangement in order to be able to place the sensor closer to the test location in this manner. The smallest pressure-sensitive sensors have a diameter of less than 1 mm with a length of approximately 20 mm. They have an edge beading which, if it is arranged in the surface of the test object, also disturbs and distorts the flow. Despite this arrangement relatively close to the test location, the membrane contained in the pressure-sensitive sensor is arranged behind a cavity and still at a certain distance from the test location. The arrangement of the cavity brings with it the risk of resonance. A further disadvantage of these miniaturized pressure-sensitive sensors must be considered to be the fact that sufficient installation depth must be provided for the distance to which they extend in the model, which is not always the case, for example with thin carrying wings. Since the pressure-absorbing membrane is not arranged in the surface at the test location in this case either, disturbances and faulty measurements result especially with rapidly varying pressures. In addition, these miniaturized pressure-sensitive sensors are very expensive, which already prohibits a multiple side-by-side arrangement in the surface of a test object.

It is also known to arrange individual piezo elements, that is to say crystals which cause electrical charges to be generated at their surface with deformation caused by pressure, in the surface at the test location for the purpose of measuring pressures. In this case two lines must be brought from the individual piezo element to a charge-sensitive amplifier so that the test signal can be further processed. If several piezo elements and lines are arranged to lie close to each other the output signals varying with time interfere with each other because the lines have high impedances. The individual signal can then no longer be associated alone with the individual test location.

SUMMARY OF THE INVENTION

The invention has the basic aim of developing a device of the type initially mentioned in such a manner that it becomes possible to measure pressure and variations of pressure with time without interference at closely adjacent test locations, in which arrangement, on the one hand, no modification of the flow should occur by the test location construction itself and, on the other hand, any interfering mutual influencing of the test signals must be prevented. Finally, the device should also be capable of being accommodated and handled in a comparatively simple manner at the test object.

According to the invention, this is achieved by the fact that the pressure-sensitive sensors are arranged flush with the surface in the carrier and the latter is arranged with the sensors flush with the surface of the test object at the test location, in the carrier an operational amplifier is provided for each sensor, the underside of each sensor is connected via as short a line as possible to its associated operational amplifier, at the carrier connections are provided for supplying the operational amplifiers and for conducting the output signals and all topsides of the sensors are connected to each other and to a combined ground connection of the operational amplifiers thru an electrically conductive coating. The pressure-sensitive sensors are arranged with several close to each other (approximately a few millimeters) on the surface of a carrier. This carrier with its sensors is then installed flush with the surface at the test location of the test subject, the surface of the carrier, which is partially formed by the sensors, in conjunction with the surface of the carrier for the rest accurately complementing the surface of the test object so that the flow is in no way modified by the arrangement of the test device. Each sensor is associated with its own operational amplifier in such a manner that as short a line connection possible is produced so that the risk of crosstalk is largely eliminated. The coating connecting the topsides of the sensors to the ground connection represents not only a line but simultaneously evens the surface at the test location. The test arrangement thus itself becomes, as it were, a part of the surface and indeed one which is not marked by holes or other penetrations. A simultaneous achievement is that measurements are taken directly at the test location, that is to say in the surface of the test object, which provides a high measuring accuracy. Transfer functions do not need to be taken into consideration. Even if the surface has a curvature, the carrier can also be prepared or constructed with a corresponding curvature. A further advantage of the invention is that the production of test objects is comparatively simplified since it is sufficient to mount the test device at the areas to be investigated on the test object and to provide connection to the test device for supply, control and output signal transmission purposes. The test device can also be installed in comparatively thin test objects. In the case of a defect, for example at one of the sensors, the test device including the carrier can easily be exchanged. Changes at the test object, for example relocation of the test point, can be carried out much more easily in comparison with the prior part. A new production of the whole test object, which has hitherto been necessary in some cases, is eliminated.

The pressure-sensitive sensors can be piezo elements or membranes connected as capacitances. The piezo elements are platelets having a thickness of for example 0.2 mm of, for example a modified lead-zirconate-titanate the surface of which carries a vapor-deposited metal layer. If this platelet is deformed, for example by being loaded with a pressure, an electric charge is created which can be fed to a measuring system via highly-sensitive amplifiers. Also possible is an arrangement of membranes which are electrically connected as part of a capacitor so that the capacitance changes when the arrangement is loaded with pressure. The change can be received either as a voltage change in a bridge arrangement or as a frequency change in a tuned-circuit arrangement so that a measurement can be taken in this manner.

The carrier can be a semi-conductor component which comprises the sensors and the operational amplifiers and can be inserted into an associated holder. The measuring device can be used with and without a holder. If a holder is used, the particular advantage of easy exchangeability at the test location is achieved.

The electrically conductive coating can be a layer of aluminum silver or similar which has been vapor-deposited or spray-deposited. This layer is applied after the carrier has been installed in the model wall and, as a result, the test device is connected flush with the surface to the test object in the area of the test location. The coating is only a few $\mu$m thick.

BRIEF DESCRIPTION OF THE DRAWINGS

The invention is further explained with the aid of the drawings, in which.

DETAILED DESCRIPTION

Figure 1:
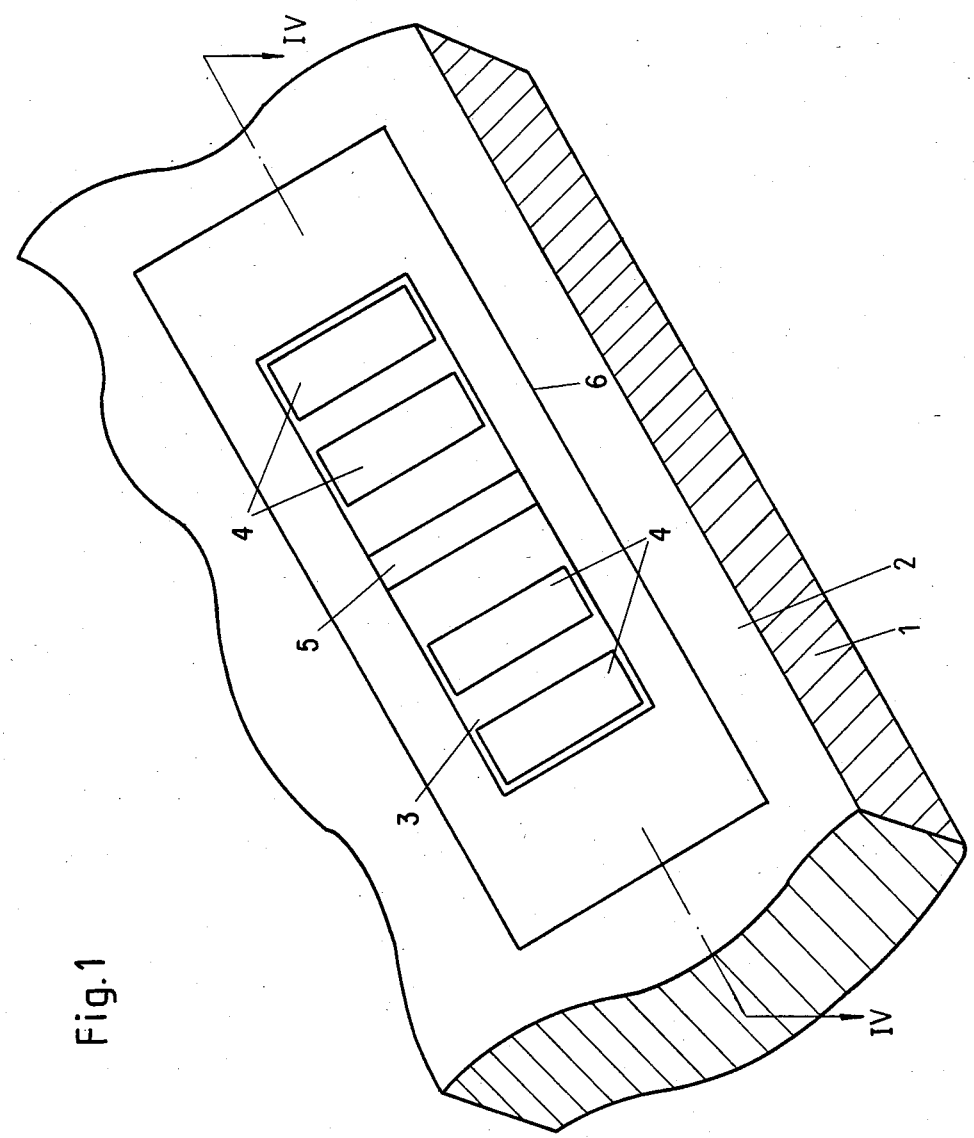
FIG. 1 shows a top view of the test device installed in the test object.

FIG. 1 shows a section of a test object 1 at the surface 2 of which pressures and variations of pressure are to be measured in the area of the surface 2 at four relatively closely adjacent locations. For this purpose, the carrier 3 of the test device comprising four sensors 4 constructed at piezo elements is installed flush with the surface 2 of the test object 1. On the surface of the carrier 3, a ground connection 5 is also provided which, like the sensors 4, is coated and smoothed by a coating 6, for example a vapor-deposited aluminum layer. The coating 6 is electrically conductive. It supplements and finally evens out also the surface 2 of the test object 1 at the test location. Naturally, the connections and the corresponding input and output lines are accommodated inside the test object 1. More details are discussed with the aid of the figures following.

Figure 2:
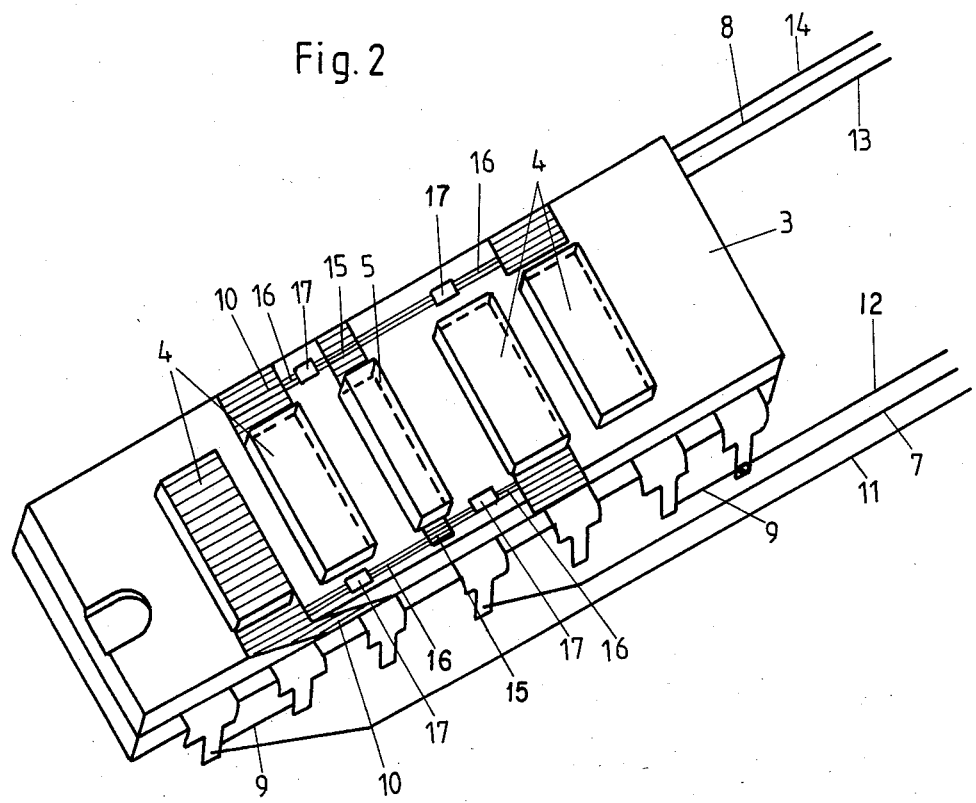
FIG. 2 shows a perspective illustration of the test device with essential details.
Figure 3:
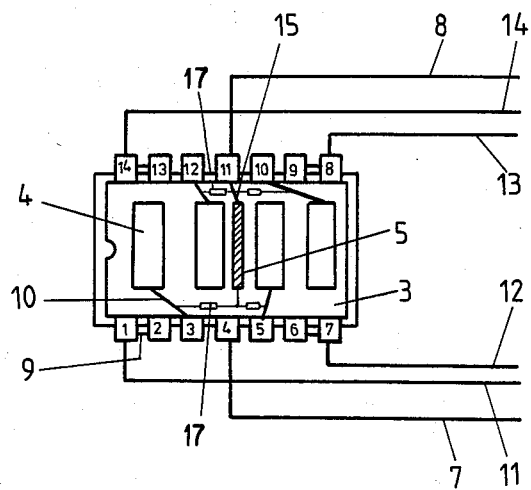
FIG. 3 shows a diagrammatic illustration of the carrier with the sensors.

FIG. 2 shows the carrier 3, which is not yet installed at the test location of the test object 1, comprising the four sensors 4 and the ground connection 5 at its surface. In the carrier 3 below the sensors 4 (not shown) or even laterally displaced with respect to the latter in each case an operational amplifier is provided, to which the sensor 4 is appropriately connected in each case. In FIG. 3, the connections 1 to 14 are continuously numbered at the carrier 3. The supply lines 7 and 8, which are finally carried to each of the four operational amplifiers, lead to the connections 4 and 11. Each operational amplifier has two input connections and one output connection. The sensor 4, designated by a reference numeral 4 in FIG. 3, has the two input connections 2 and 3 and the output connection 1. The input connection 2 and the output connection 1 are connected by a connecting line 9. A line 10 leads from the underside of the sensor 4 to the input connection 3 and via an input resistance 17 to the ground connection 5. The output line 11 is connected to the output connection 1. Since four sensors 4 are provided on the carrier 1, this arrangement exists in each case four times so that the output lines 12, 13, 14 are additionally available. For each sensor 4, a line 16 is provided, in which an input resistance 17 is arranged. All lines 16 are connected via the connections 15 to the ground connection 5. FIG. 2 shows that this arrangement is mounted on the carrier 3. Naturally, the input resistance 17 can also be accommodated integrated within the carrier. The lines 10 and connections 15 can consist of vapor-deposited or spray-deposited silver layers (conductive silver, conductive adhesive).

Figure 4:
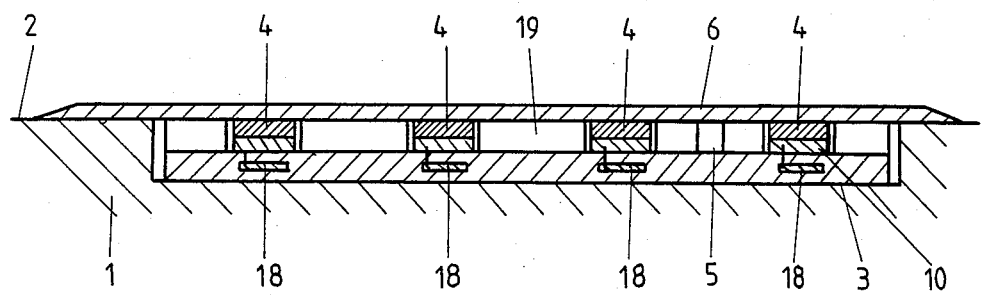
FIG. 4 shows a section according to line IV—IV in FIG. 1.

As can be seen in FIG. 4, operational amplifiers 18 are arranged in the carrier 3 approximately underneath the sensors 4. Each piezo element serving as sensor 4 has an approximate thickness of 0.2 mm. The line 10 which connects the underside of the respective sensor 4 to the respective operational amplifier 18 is shown diagrammatically. It has a thickness of a few $\mu$m. The coating 6 is shown greatly enlarged because its thickness is also only a few $\mu$m. The space between the sensors 4 can be evened out by an electrically insulating filling layer 19 which does not come into contact with the sensors so that finally the coating applied joins the surface 2 of the test object 1 in a smooth and flush manner.

Figure 5:
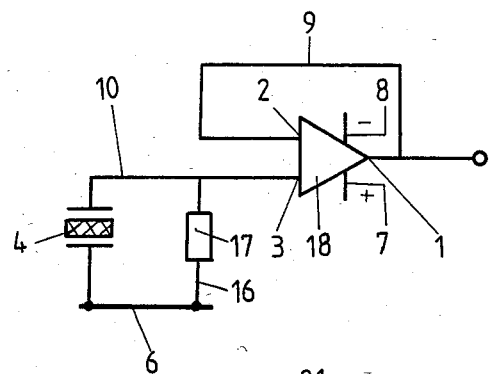
FIG. 5 shows the circuit of an individual piezo element and its associated operational amplifier.

FIG. 5 shows a circuit of a single piezo element constructed as a sensor. The operational amplifier 18 is provided with the two inputs 2 and 3 and the output 1. It is supplied via the lines 7 and 8. The input 2 is connected to the output 1 via the connecting line 9. The line 10 leads from the sensor 4 to the input connection 3 of the operational amplifier. On the other hand, the surface of the sensor 4 is connected to the coating 6. The input resistance 17 is provided in parallel with this in the line 16.

Figure 6:
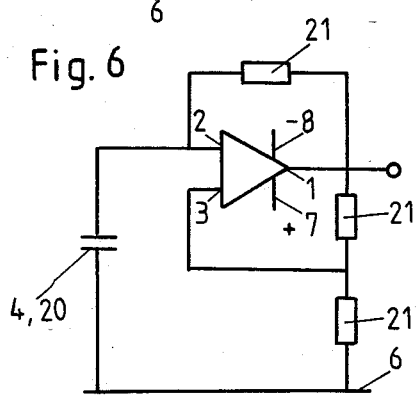
FIG. 6 shows the circuit of an individual capacitive sensor in a tuned-circuit arrangement and its associated operational amplifier.

FIG. 6 shows a circuit of a sensor 4 which is connected as a capacitance in a tuned-circuit arrangement. In this arrangement, additional resistances 21 are accommodated in the carrier 3. The capacitor 20 serving as sensor 4 and the capacitance is obtained by applying a thin, electrically insulating foil to the carrier 3. This makes the total arrangement even thinner.

List of Reference Numerals 1. test object
2. surface
3. carrier
4. sensor
5. ground connection
6. coating
7. supply line
8. supply line
9. connecting line
10. line
11. output line
12. output line
13. output line
14. output line
15. line
16. line
17. input resistance
18. operational amplifier
19. filling layer
20. capacitor
21. resistance

We claim:

1. Device for measuring pressures and variations of pressure with time at the surface of test objects, for example wind tunnel models, test vehicles and aircraft, comprising a plurality of pressure-sensitive sensors arranged on a carrier, wherein the pressure-sensitive sensors (4) are to be arranged flush with the surface in the carrier (3) and the latter is to be arranged with the sensors (4) flush with the surface of the test object (1) at the test location, in the carrier (3) an operational amplifier (18) is provided for each sensor (4), the underside of each sensor (4) is connected via as short a line (10) as possible to its associated operational amplifier (18), at the carrier (3) connections (4, 11) are provided for supplying the operational amplifiers (18) and for conducting the output signals and all topsides of the sensors (4) are connected to each other and to a combined ground connection (5) of the operational amplifiers (18) thru an electrically conductive coating (6).

2. Device as claimed in claim 1, wherein piezo elements or membranes connected as capacitances are provided as pressure-sensitive sensors (4).

3. Device as claimed in claim 1 or 2, wherein the carrier (3) is a semi-conductor component which comprises the sensors (4) and operational amplifiers (18) and which can be inserted in an associated holder.

4. Device as claimed in claim 1, wherein the electrically conductive coating (6) is a layer of aluminum or silver which has been vapor-deposited or spray-deposited.

* * * * *